(12) United States Patent
Christiansen

(10) Patent No.: US 12,045,543 B2
(45) Date of Patent: Jul. 23, 2024

(54) USING VOICE INPUT TO CONTROL A USER INTERFACE WITHIN AN APPLICATION

(71) Applicant: State Farm Mutual Automobile Insurance Company, Bloomington, IL (US)

(72) Inventor: Duane Christiansen, Eureka, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/213,604

(22) Filed: Jun. 23, 2023

(65) Prior Publication Data

US 2023/0333811 A1    Oct. 19, 2023

Related U.S. Application Data

(63) Continuation of application No. 17/065,343, filed on Oct. 7, 2020, now Pat. No. 11,687,318.
(Continued)

(51) Int. Cl.
*G06F 3/14* (2006.01)
*G06F 3/147* (2006.01)
(Continued)

(52) U.S. Cl.
CPC .............. *G06F 3/167* (2013.01); *G06F 18/24* (2023.01); *G06N 20/00* (2019.01)

(58) Field of Classification Search
USPC .................... 345/156, 173, 214, 4–9, 30–56; 399/81–82; 704/1–275; 715/273,
(Continued)

(56) References Cited

U.S. PATENT DOCUMENTS

| 8,015,009 B2 | 9/2011 | Harband et al. |
| 9,057,746 B1 | 6/2015 | Houlette et al. |

(Continued)

FOREIGN PATENT DOCUMENTS

| CN | 111626536 | 9/2020 |
| CN | 113138558 | 7/2021 |

(Continued)

OTHER PUBLICATIONS

Corbett, E., & Weber, A. (Sep. 2016). What Can I say? Addressing User Experience Challenges of a Mobile Voice User Interface for Accessibility. In Proceedings of the 18th international conference on human-computer interaction with mobile devices and services (pp. 72-82). See highlighted sections.

(Continued)

*Primary Examiner* — Marcellus J Augustin
(74) *Attorney, Agent, or Firm* — Lee & Hayes, P.C.

(57) ABSTRACT

Techniques include a method of providing a user interface on a device. The user interface has at least a first display portion, a second display portion and a third display portion, the second display portion including a link to the third display portion that, when activated by a user, cause the device to present the third display portion of the user interface, the first display portion not including the link to the third display portion. The method includes causing the first display portion to be displayed. The method further includes receiving audible input while the first display portion is being displayed. The method further includes determining that the third display portion corresponds to an utterance in the audible input based at least in part on labels determined to match the utterance. The method further includes causing the third display portion to be displayed.

20 Claims, 6 Drawing Sheets

Related U.S. Application Data

(60) Provisional application No. 62/914,059, filed on Oct. 11, 2019.

(51) Int. Cl.

| | | |
|---|---|---|
| *G06F 3/16* | (2006.01) | |
| *G06F 16/43* | (2019.01) | |
| *G06F 16/438* | (2019.01) | |
| *G06F 18/00* | (2023.01) | |
| *G06F 18/24* | (2023.01) | |
| *G06N 20/00* | (2019.01) | |

(58) Field of Classification Search
USPC .................................................. 715/700–866
See application file for complete search history.

(56) References Cited

U.S. PATENT DOCUMENTS

| | | |
|---|---|---|
| 9,152,737 B1 | 10/2015 | Micali et al. |
| 9,443,195 B2 | 9/2016 | Micali et al. |
| 9,609,003 B1 | 3/2017 | Chmielewski et al. |
| 9,699,529 B1 | 7/2017 | Petri et al. |
| 9,710,224 B2 | 7/2017 | Kim et al. |
| 9,739,813 B2 | 8/2017 | Houlette et al. |
| 9,754,586 B2 * | 9/2017 | Deligne .................. G10L 15/19 |
| 9,798,979 B2 | 10/2017 | Fadell et al. |
| 9,800,958 B1 | 10/2017 | Petri et al. |
| 9,942,630 B1 | 4/2018 | Petri et al. |
| 10,021,235 B2 * | 7/2018 | Jeong .................... H04M 1/576 |
| 10,102,584 B1 | 10/2018 | Devereaux et al. |
| 10,142,394 B2 | 11/2018 | Chmielewski et al. |
| 10,198,771 B1 | 2/2019 | Madigan et al. |
| 10,296,978 B1 | 5/2019 | Corder et al. |
| 10,311,302 B2 | 6/2019 | Kottenstette et al. |
| 10,311,874 B2 | 6/2019 | Guthery |
| 10,332,059 B2 | 6/2019 | Matsuoka et al. |
| 10,366,288 B1 | 7/2019 | Kottenstette et al. |
| 10,469,282 B1 | 11/2019 | Konrardy et al. |
| 10,586,177 B1 | 3/2020 | Choueiter et al. |
| 10,643,072 B2 | 5/2020 | Kottenstette et al. |
| 10,664,922 B1 | 5/2020 | Madigan et al. |
| 10,691,407 B2 | 6/2020 | Yoo et al. |
| 10,699,346 B1 | 6/2020 | Corder et al. |
| 10,699,348 B1 | 6/2020 | Devereaux et al. |
| 10,735,829 B2 | 8/2020 | Petri et al. |
| 10,740,691 B2 | 8/2020 | Choueiter et al. |
| 10,750,252 B2 | 8/2020 | Petri et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,818,105 B1 | 10/2020 | Konrardy et al. |
| 10,907,844 B2 | 2/2021 | Ribbich et al. |
| 11,003,334 B1 | 5/2021 | Conway et al. |
| 11,010,643 B1 | 5/2021 | Campbell |
| 11,100,594 B1 | 8/2021 | West et al. |
| 11,151,378 B2 | 10/2021 | Kottenstette et al. |
| 11,164,257 B1 | 11/2021 | Devereaux et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,232,873 B1 | 1/2022 | Aspro et al. |
| 11,277,465 B2 | 3/2022 | Chmielewski et al. |
| 11,348,193 B1 | 5/2022 | Konrardy et al. |
| 11,367,265 B2 | 6/2022 | Vianello et al. |
| 11,417,212 B1 | 8/2022 | Farooqui et al. |
| 2006/0247925 A1 | 11/2006 | Haenel et al. |
| 2009/0265193 A1 | 10/2009 | Collins et al. |
| 2014/0266669 A1 | 9/2014 | Fadell et al. |
| 2014/0344718 A1 | 11/2014 | Rapaport et al. |
| 2014/0350928 A1 | 11/2014 | Zeigler et al. |
| 2015/0061859 A1 | 3/2015 | Matsuoka et al. |
| 2015/0347910 A1 | 12/2015 | Fadell et al. |
| 2019/0251520 A1 | 8/2019 | Bentley et al. |
| 2021/0279811 A1 | 9/2021 | Waltman et al. |
| 2021/0312789 A1 | 10/2021 | Linn |
| 2022/0101275 A1 | 3/2022 | Aspro et al. |
| 2022/0156039 A1 * | 5/2022 | Thangarathnam ...... G10L 15/30 |
| 2022/0391083 A1 | 12/2022 | Strader et al. |

FOREIGN PATENT DOCUMENTS

| | | |
|---|---|---|
| JP | 2003157357 | 5/2003 |
| JP | 6353786 | 7/2018 |
| KR | 20150129845 | 11/2015 |
| KR | 20160025772 | 3/2016 |
| WO | WO2014159131 | 10/2014 |
| WO | WO2016081511 | 5/2016 |
| WO | WO2021087185 | 5/2021 |

OTHER PUBLICATIONS

Srinivasan, A., Dontcheva, M., Adar, E., & Walker, S. (Mar. 2019). Discovering Natural Language Commands in Multimodal Interfaces. In Proceedings of the 24th International Conference on Intelligent User Interfaces (pp. 661-672). See highlighted sections.

* cited by examiner

USING VOICE INPUT TO CONTROL A USER INTERFACE WITHIN AN APPLICATION

CROSS REFERENCE TO RELATED APPLICATIONS

This application is a continuation of, and claims priority to, U.S. application Ser. No. 17/065,343, filed on Oct. 7, 2020, which is a nonprovisional of, and claims priority to, U.S. Provisional Patent Application No. 62/914,059, filed on Oct. 11, 2019, the entire contents of the above applications are incorporated herein by reference.

BACKGROUND

With a trend towards portability and away from larger footprint computing devices, mobile phones and network-connected tablets are becoming dominant computing platforms. The smaller touch-screen displays of these and other small-format computing devices provide less space for visual/tactile user interface navigational aids. It can be difficult for a user to locate a portion of a visual/tactile user interface to accomplish particular functionality of an application being executed by such a device. For example, locating the portion of the visual/tactile user interface to accomplish the particular functionality may require a user to navigate many levels of a hierarchy of visual/tactile user interface display portions. This may frustrate the user, particularly since the smaller display size of the small-format computing device may be more difficult to navigate.

SUMMARY

This disclosure describes techniques including a method of providing a user interface on a device, the user interface having at least a first display portion, a second display portion and a third display portion, the second display portion including a link to the third display portion that, when activated by a user, cause the device to present the third display portion of the user interface, the first display portion not including the link to the third display portion. The method includes causing the first display portion to be presented on a display of the device and receiving audible input while the first display portion is being displayed. The method further includes determining one or more labels that match an utterance in the audible input and processing the one or more labels to determine a confidence level, the confidence level indicating a degree to which a label of the one or more labels corresponds to the utterance. The method further includes, based at least in part on the confidence level, determining that the third display portion corresponds to the utterance in the audible input and causing the third display portion to be presented on the display.

For example, the techniques may be implemented in the context of mobile phones or even, more generally, devices employed in the Internet of Things (IoT). However, the techniques described herein are not limited to use with a small-format electronic device. Some of the techniques may be performed by a back-end server or other remotely-accessible computing device, such as in the "cloud," in communication with a small-format or other computing device continuously, intermittently or otherwise. The techniques are not limited by this disclosure to being performed by a computing device at any particular location.

In many cases, when the one or more processors of the small-format electronic device processes the utterance, the one or more processors is not presenting a direct link to the display portion of the visual/tactile user interface to accomplish the particular functionality. Notwithstanding, as a result of processing and classifying the utterance in the audible input, the one or more processors causes the presentation, on the display of the small-format electronic device, the visual/tactile user interface to accomplish the particular functionality.

In some examples, prior to causing the presentation on the display of the portion of the visual/tactile user interface to accomplish the particular functionality, the one or more processors causes an indication of the display portion (e.g., an audio indication and/or a haptic indication) to be presented, such as visually, tactilely, and/or audibly. This can allow a user an opportunity to confirm that the display portion should be presented. For example, the user may indicate that the display portion of the visual/tactile user interface should not be presented (or not indicate that the display portion of the visual/tactile user interface should be presented), possibly because the determination of the display portion based on the utterance does not match the user's intention. In some examples, in response to a similar utterance being received a particular number of times, such as two times, a processor of the small-format electronic device queues a representation of the utterance, to be provided for additional training of a machine learning model.

For example, the one or more processors of the small-format electronic device or a processor executing an application on a server or other remotely-accessible computing device or devices may determine a particular threshold, to which the confidence level may be compared. For example, determining the confidence level may be based at least in part on determining a level of confidence determined for a set of training utterances that do not correspond to any label known by bag of words processing or other label determination processing. The level of confidence determined in this way may, statistically, be lower than a level of confidence determining for actual utterances that do correspond to labels known by the label determination processing. By setting the threshold above the level of confidence determined for a set of training utterances that do not correspond to any label known by the label determination processing, this may minimize the number of false positive matches of actual utterances to labels known by the label determination processing.

Utilizing the determined label based on the determined confidence level may, in some examples, comprise a processor of the small-format electronic device causing a representation of the label to be presented, such as audibly, using a speaker or audio output electronics incorporated into the small-format electronic device. In some examples, the one or more processors of the small-format electronic device may cause to be presented, on a display of the small-format electronic device, the display portion of the visual/tactile user interface to accomplish the determined particular functionality without regard for input of the user responsive to the provided representation of the label. In other examples, as discussed above, a confirmatory response (which may be, for example, provided by speech or by touch) may be required to be received by the one or more processors of the small-format electronic device before the one or more processors of the small-format electronic device may present, on a display of the small-format electronic device, the display portion of the visual/tactile user interface to accomplish the determined particular functionality, thus providing some level of assurance that the display portion of the visual/tactile user interface presented on a display of the small-format electronic device matches what the user intended to be presented when making the utterance. In some examples, the confirmatory response may also be provided as input to a natural language machine learning model, which can enhance the effectiveness of the machine learning model in matching labels to utterances, such as to a bag of words in the utterances, spoken by users of the small-format electronic device executing the particular application.

The labels may uniquely correspond to functionality provided by the particular application being executed by the small-format electronic device. In some examples, the label determination, such as bag of words label matching, may be uniquely suited for use with the particular application being executed by the small-format electronic device as opposed, for example, to a more general non-specialized matching, such as may be provided as part of an operating system or by a third party provider for more general use, without specific knowledge of, or configuration for use with, the particular application.

In some examples, the label determination, such as bag of words label matching, may be trained dynamically, as audible input including utterances of users of a particular application being executed by a small-format electronic device are provided to the label determination. The label matching may be centralized, "in the cloud" or otherwise centrally available to one or more small-format electronic devices that are utilizing the techniques described herein. The label determination training may be centralized to determine a configuration usable to match utterances with words and/or words with labels, and the result of such training may be provided to a plurality of small-format electronic devices for use when audible input, including an utterance, is received from a user of the particular application. In some examples, label determination training and/or label determination is distributed in some fashion among a centralized or network-accessible cloud-based service and a plurality of small-format electronic devices executing the particular application and utilizing the techniques described herein.

The techniques are discussed in many instances in the context of a hierarchical linking structure for the display portions of the user interface. For example, the techniques may be implemented with an application for which the display portions of a user interface are organized hierarchically and, to reach a particular display portion, the user would navigate through display portions of the user interface in successively lower levels of the hierarchical display portion organization. However, the techniques may be utilized with other types of display portion organizations, including those that are not organized hierarchically.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
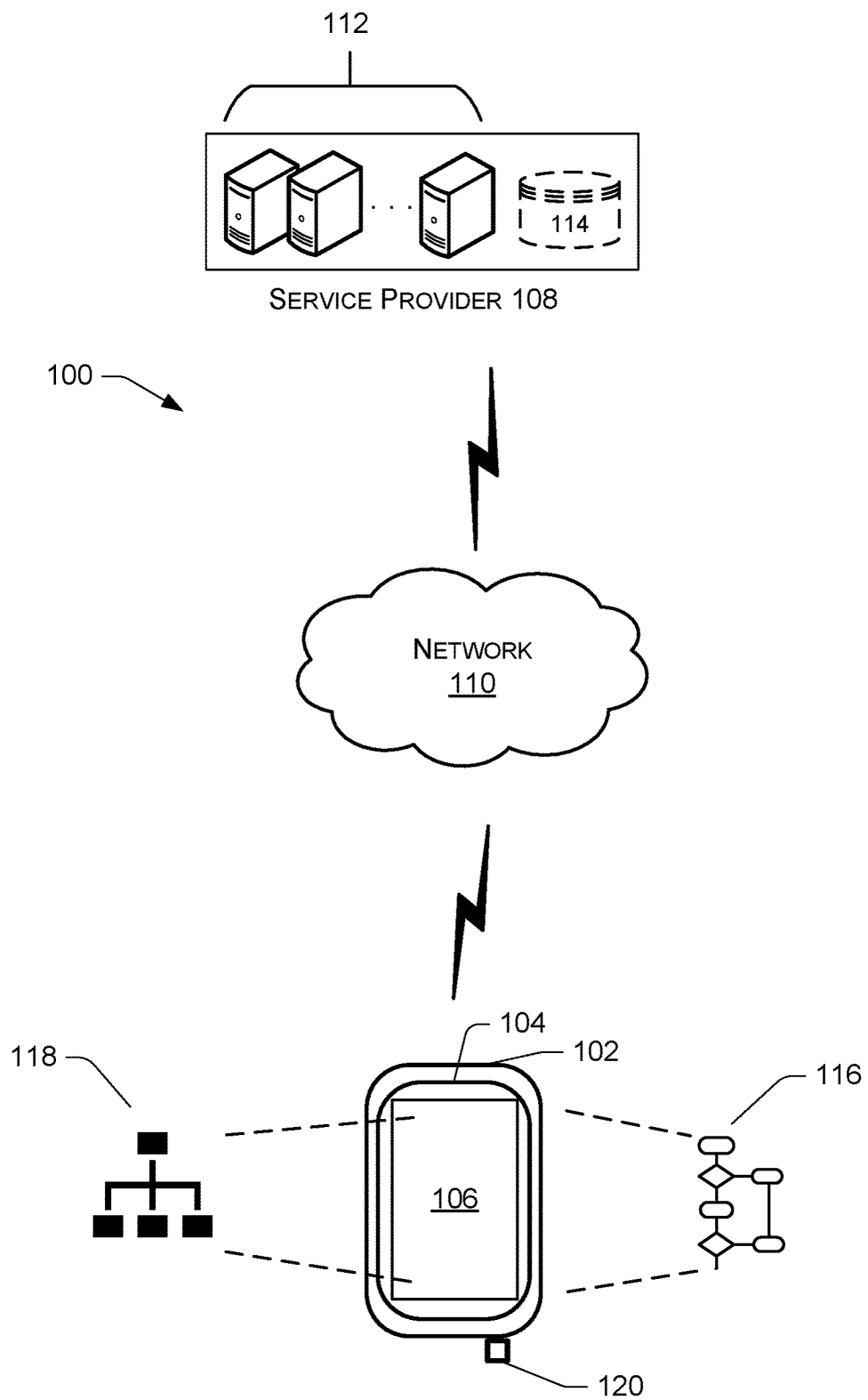
FIG. 1 is a schematic diagram of an example network architecture.

FIG. 1 is a diagram illustrating an example environment or architecture 100. The example architecture 100 includes a small-format electronic device 102, which may incorporate a touch screen 104 or other visual/tactile display. The small-format electronic device 102 is an example, and the electronic device 102 need not be limited to any particular format or size. In one example, the small-format electronic device 102 is a mobile phone or network-connected tablet, but other types of devices may be utilized as well.

The touch screen 104 is suitable for presenting a display portion of a user interface 106 of an application being executed by the small-format electronic device 102. The application may be, for example, an application usable by an insurance company/bank customer to access information and functionality associated with the customer's business dealings with the insurance company, such as viewing information about a home or auto policy, viewing interest rates for savings product and/or loans, applying for a checking account, etc. The application usable by an insurance company/bank customer is an example, and other examples are possible. As just some other examples, the application may be usable by a phone company's customer to access information and functionality associated with the customer's business dealings with the phone company. The application may be to provide functionality other than to be usable for a customer of an entity to access information and functions associated with a customer's business dealings with the entity. In other examples, the application may be a game, dating application, communication application (e.g., to facilitate VoIP communications over the internet, or email), or any other type of application. In some examples, the electronic device is embedded into a device or is part of a device (such as an automobile, a refrigerator, or a "smart" thermostat or other IoT-type device), and the application may provide functionality to control the device into which the electronic device is embedded, based at least in part on input and/or other interaction from a user.

Still referring to FIG. 1, the small-format electronic device 102 may execute the application and, in some examples, the small-format electronic device 102 may execute the application in cooperation with functionality of a service provider 108 that is in communication with the small-format electronic device 102 via a network 110. The service provider 108 may include one or more servers 112 and one or more storage devices 114. For example, using the insurance company/bank example, the portion of the application being executed by the small-format electronic device 102 may be primarily to interface with the user, including to present information to the user and to gather input from the user. The service provider 108 may be executing a portion of the application and/or other functionality (such as enterprise applications) to process information provided by the user to the portion of the application executing on the small-format electronic device 102 and communicated to the service provider 108 via the network 110. In some examples, the information provided by the user and communicated to the service provider 108 is processed by the service provider 108 and/or other functionality executing a portion of the application, and the service provider 108 and/or other functionality generates responsive information to be communicated over the network 110 back to the small-format electronic device 102 for presentation to the user by the one or more processors of the small-format electronic device 102 executing a portion of the application.

The user interface 106 may be a visual/tactile user interface. It may display text and/or graphics/symbols that can be "touched" by the user to activate certain functionality represented by the displayed text and/or graphics/symbols. The one or more processors of the electronic device 102 may execute functionality 116 (which may be a portion of the application in cooperation with functionality provided by an operating system of the electronic device 102, such as by using an application programming interface call to the operating system) to cause the presentation of various display portions 118 of an application's visual/tactile user interface 106. In the example architecture 100, the display portions 118 of the user interface 106 are represented as being conceptually organized in a hierarchical manner, but other conceptual organizations of the display portions are possible. Functionality of the application to provide for navigation among the display portions may include functionality for the one or more processors executing the application to cause the presentation, on one display portion of the user interface 106, visual indications of a plurality of other display portions of the user interface 106, such as "links" or representing links to, the plurality of other display portions of the user interface 106. The application being executed by the small-format electronic device 102 may include functionality for the one or more processors, in response to a user touching the visual indication of a second display portion of the user interface 106, to cause the second display portion of the user interface 106 to be presented.

The small-format electronic device 102 may include a microphone 120 configured to receive audible input from the environment, including utterances from a user, and to provide a representation of the audible input to a processor of the small-format electronic device 102 executing an application or other functionality. The microphone 120 may be interior to a housing of the small-format electronic device 102, or other configurations for providing the microphone 120 are possible. As just one example, if the small-format electronic device is a mobile phone communicating wirelessly with an entertainment system in an automobile, a microphone 120 may be provided as part of the automobile's entertainment system. In an example where the small-format electronic device 102 is an IoT device such as a smart thermostat, a microphone 120 may be provided as part of or connected to the IoT device.

In the example architecture 100, the small-format electronic device 102 also includes an audio processor (not shown) to process the audible input received by the microphone 120. As is discussed in more detail later, the functionality 116 for the one or more processors of the small-format electronic device 102 may include causing the presentation of a first display portion 118 of the user interface 106, and presenting a second display portion 118 based on a user utterance contained in received audible input.

The service provider 108 may provide remote resources to the small-format electronic device 102. In some instances, the service provider 108 comprises, for example, one or more central office systems that include a security service such as Authentication, Authorization and Accounting (AAA) server, a network registration service such as Dynamic Host Configuration Protocol (DHCP) server, a network management service (NMS), a database, a diagnostic system (in a manufacturing context), an inventory system (in a warehouse context), a patient record system (in the healthcare context), a billing system, etc. The small-format electronic device 102 may register and/or interact with some or all of these one or more central office systems. In one example, the one or more central office systems may implement functionality such as web services, cloud services, and so on. In yet other instances, the service provider 108 may be implemented as other types of devices, such as in the context of the Internet of Things (IoT), that allows a variety of devices to exchange data. In some instances, the service provider 108 may be referred to as a central agent.

The service provider 108 may be physically located in a single central location or may be distributed at multiple different locations. The service provider 108 may be hosted privately by an entity administering all or part of the communications network (e.g., a utility company, a governmental body, distributor, a retailer, manufacturer, etc.), or may be hosted in a cloud environment, or a combination of privately hosted and cloud hosted services. The service provider 108 may be implemented as one or more computing devices including servers (such as servers 112), desktop computers, or the like that include one or more processors executing computer program instructions. In one example, the service provider 108 is configured in a server cluster, server farm, data center, mainframe, cloud computing environment, or a combination thereof. To illustrate, the service provider 108 may operate as a cloud computing device that provides cloud services, such as storage, processing, and so on.

The small-format electronic device 102 and/or the service provider 108 may transmit and/or receive Protocol Data Units (PDUs). A PDU may comprise a bit, frame, packet, segment, or another unit of data. A PDU may include control data and/or payload data. As used herein, a message, transmission, communication, or the like may refer to any type of PDU. The electronic device 102 and/or the service provider 108 may perform various operations to facilitate the techniques discussed herein. The service provider 108 and/or electronic device 102 may include a database or other data store that holds data to facilitate performance of the techniques discussed here.

Figure 2:
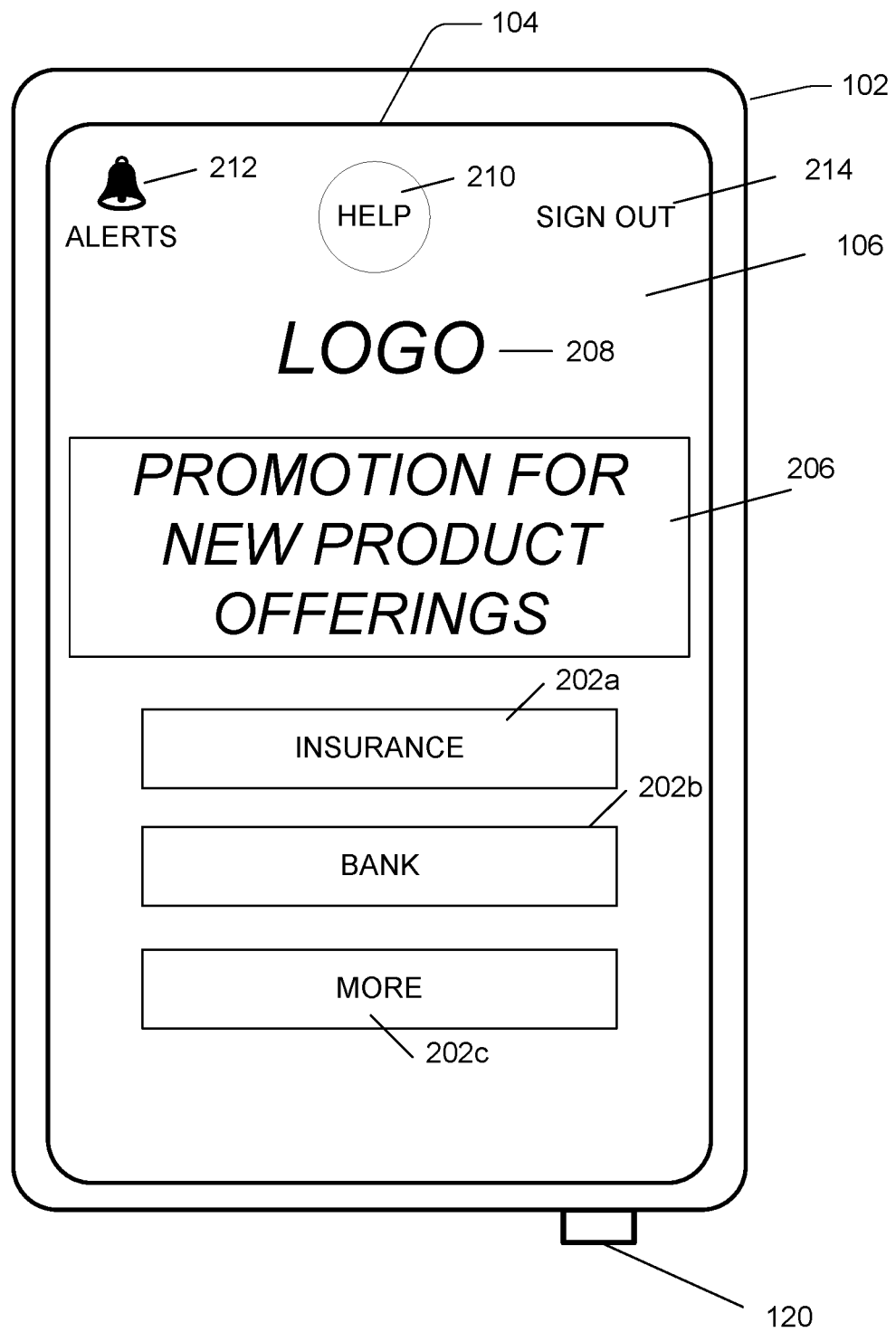
FIG. 2 illustrates an example of a small-format electronic device, with an example "main menu" display portion presented on a user interface.

FIG. 2 illustrates an example of the small-format electronic device 102 in greater detail, with an example "main menu" display portion presented on the user interface 106 as a result of processing by a processor of the small-format electronic device 102. The display portion presented on the user interface 106 as illustrated in the FIG. 2 example includes three tactilely activatable links—labelled 202a (insurance), 202b (bank) and 202c (more). These are examples, and there are many different possibilities of tactilely activatable links depending, for example, on the application being executed by the small-format electronic device 102. A promotion portion 206 for promoting new product offerings of the application provider is also presented on display 104 as part of the user interface 106. The promotion portion 206 may also be tactilely activatable. The user interface 106 also includes a logo 208 for the company or other entity associated with the application being executed by the small format electronic device 102.

In addition, the one or more processors may cause a help button 210 to be presented, as well as an alert button 212.

When the help button 210 is tactilely activated (e.g., the portion of the display on which the help button 210 is presented is touched by the finger of a user), the one or more processors of the small-format electronic device 102, executing the application, may cause context-relevant help information to be presented on the display 104 as part of the user interface 106. When the alert button 212 is tactilely activated, the one or more processors of the small-format electronic device 102 may cause alert messages to be presented on the display 104 as part of the user interface 106. In addition, a sign out button 214 is provided and, when tactilely activated, the one or more processors of the small-format electronic device 102 may cause the small-format electronic device 102 to disconnect from particular functionality provided by the application, at least some of which may be provided in cooperation with the service provider 108.

As can be seen from the example user interface 106 illustrated in FIG. 2, particularly for smaller format electronic devices such as the small-format electronic device 102, the physical size of items (including tactilely activatable links) on the user interface 106 can be small, and these items may be physically difficult to tactilely activate because of their small size. The small size of tactilely activatable items can cause users to become frustrated with the application being executed by the small-format electronic device 102, as well as to be become frustrated with the purveyor of the application. In addition, due to the limited size of the small-format electronic device 102, it may be desirable to present fewer tactilely activatable link at one time, which may lead to having many layers of display portions that might need to be navigated to reach a particular functionality of the application being executed by the one or more processors of the small-format electronic device 102. Many users are utilizing their small electronic devices as their primary computing platform and, thus, application providers are packing more functionality into applications for the small electronic devices. As a result, the navigation challenge may be even greater for these high-functionality applications.

Figure 3:
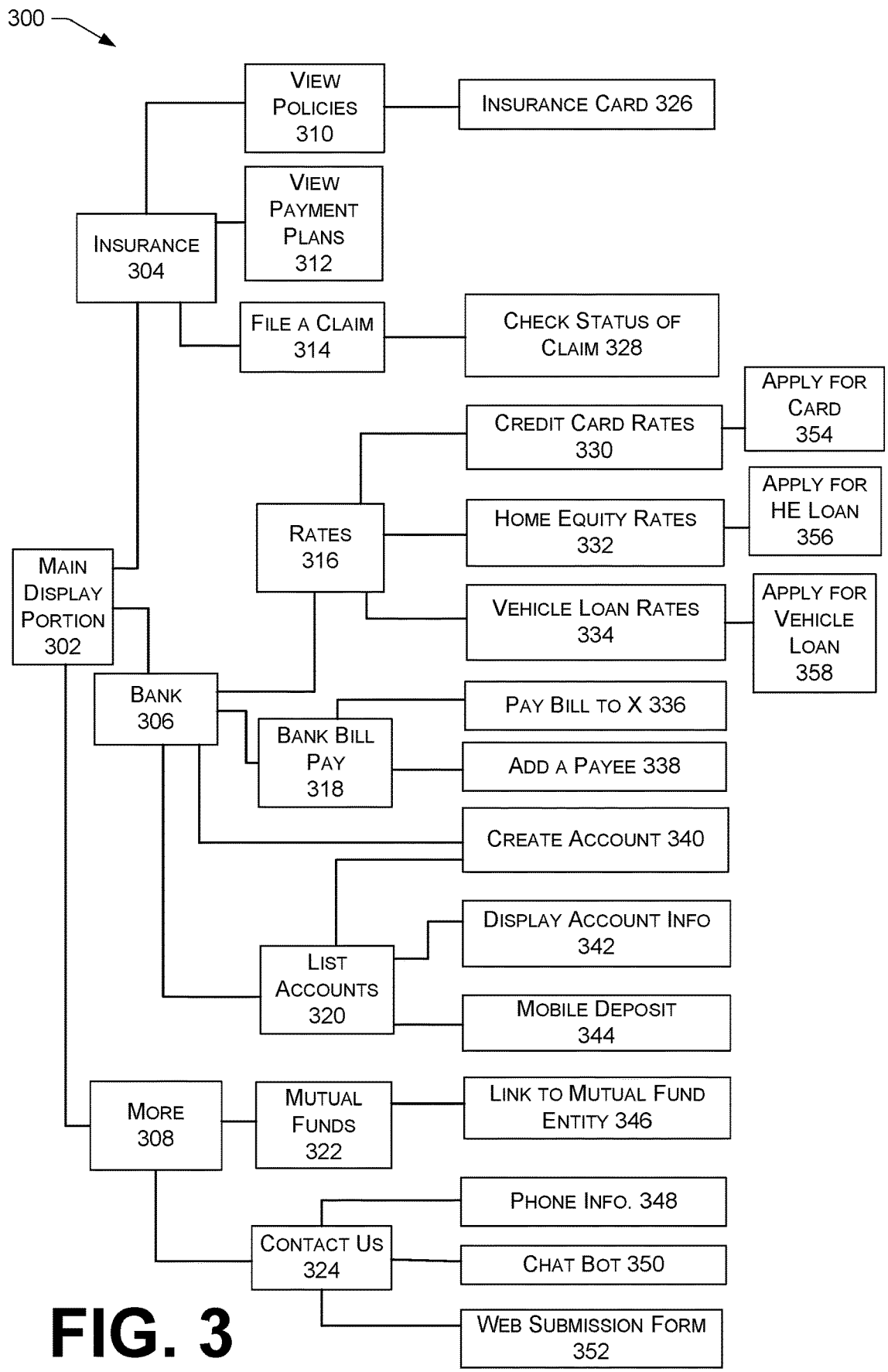
FIG. 3 schematically illustrates an example of a complex display portion hierarchy.

With regard to layers of display portions, FIG. 3 schematically illustrates an example of a display portion hierarchy 300 for which navigation by a user may be challenging. An example main display portion 302 may include tactilely activatable links to insurance 304, bank 306 and more 308 user interface display portions, similar to the example display portion shown in the FIG. 2 example. Each of the tactilely activatable links 304, 306 and 308 may corresponds to user interface display portions that include links to additional display portions. For example, the insurance tactilely activatable link 304 may correspond to a display portion that includes a "view policies" tactilely activatable link 310, a "view payment plans" tactilely activatable link 312 and a "file a claim" tactilely activatable link 314. The "view policies" tactilely activatable link 310 may include an "insurance card" tactilely activatable link 326. Due to the complex structure (which need not even be hierarchical), a user may need to navigate several layers of display portions in order to reach a display portion via which desired functionality can be utilized. For example, it may be necessary to navigate through the bank tactilely activatable link 306, rates tactilely activatable link 316 and/or credit card rates tactilely activatable link 326 to reach the apply for card 320 user interface display portion.

As another example, it may be necessary to navigate through the "bank" tactilely activatable link 306 and the "list accounts" tactilely available link 320 to reach the "mobile deposit" user interface display portion. For example, a user interested in making a mobile deposit may navigate from the user interface display portion corresponding to the "bank" tactilely activatable link 306 to the user interface display portion corresponding to the "list accounts" tactilely activatable link 320. The one or more processors may fetch a list of the user's accounts, such as from the service provider 108 and display an indication of any errors.

Further, for example, if the user has no accounts, then the one or more processors may present a user interface display portion from which a user may create an account, such as the user interface display portion corresponding to the "create account" tactilely activatable link 340. The one or more processors may, for example, present this user interface display portion as a separate flow, such that, after the user has created an account, the one or more processors may display a list of the user's accounts that includes the newly-created account, in a user interface display portion corresponding to the "list accounts" tactilely activatable link 320.

The one or more processors may then display a user interface portion corresponding to the "mobile deposit" tactilely activatable link 344, based at least in part in response to the user activating the "mobile deposit" tactilely activatable link 344 in the user interface display portion corresponding to the "list accounts" tactilely activatable link 320. The one or more processors may fetch details for all of the user's accounts and present a list of all accounts eligible for mobile deposit. If there are no accounts eligible for mobile deposit, the one or more processors may display a user interface display portion via which the user may enroll in mobile deposit for one or more of the user's accounts.

Alternatively, the user may select one of the listed accounts, and the one or more processors may fetch details for the selected account and determine whether the selected account is eligible for mobile deposit. If the account is not eligible for mobile deposit, the one or more processors may display a user interface display portion via which the user may enroll in mobile deposit for the selected account. In either scenario, the one or more processors may then display a user interface display portion for the user to accomplish the mobile deposit functionality for the selected and/or eligible account.

Figure 4:
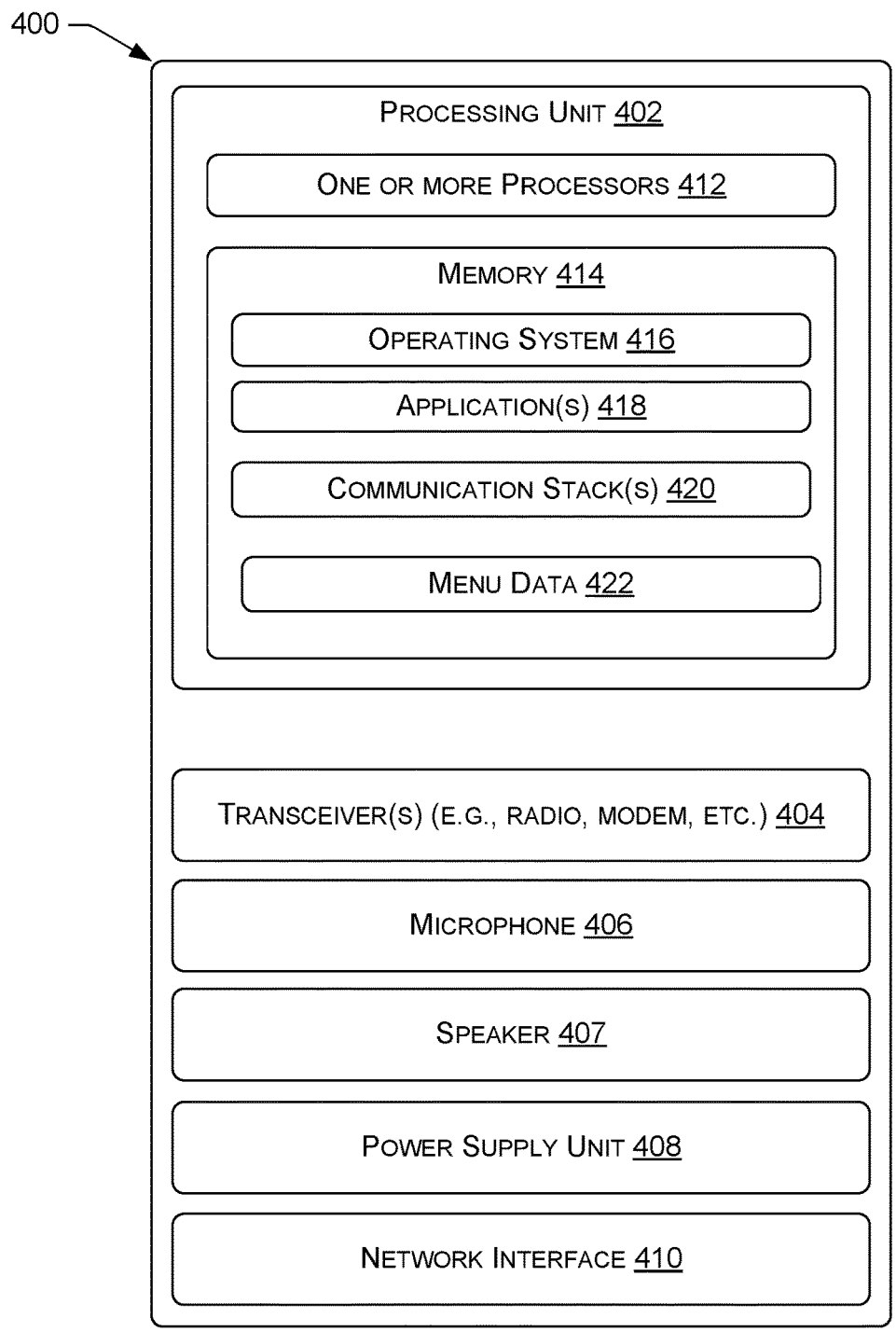
FIG. 4 is a diagram showing details of an example electronic device on which aspects of the disclosed techniques may be exhibited.

FIG. 4 schematically illustrates components of an example electronic device 400 that may comprise the small-format electronic device 102. The example electronic device 400 may comprise any type of device, such as a mobile phone or other mobile computer device (e.g., a tablet computing device), a personal computer such as a desktop computer or laptop computer, a portable navigation device, gaming device, portable media player. television, set-top box, automated teller machine, and so forth. In some examples, the electronic device 400 is an IoT device, such as a connected thermostat, home appliance, security system, doorbell or smoke alarm.

As shown in FIG. 4, an example electronic device 400 may include at least one of a processing unit 402, a transceiver 404 (e.g., radio, modem, etc.), a microphone 406, a speaker 407, power supply unit 408, and a network interface 410. The processing unit 402 may include one or more processors 412 and memory 414. The one or more processors 412 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 404 may comprise one or more hardware and/or software implemented radios to provide two-way RF communication with other network communication devices in a network. The transceiver 404 may additionally or alternatively include a modem or other interface device to provide wired communication from the electronic device 400 to other devices.

The microphone 406 may comprise physical hardware though, in some cases, an audio input interface may instead be provided to interface to an external microphone or other sound receiving device. Similarly, the speaker 407 may comprise physical hardware though, in some cases, an audio output interface may instead be provided to interface to an external speaker or other sound emitting device. The power supply unit 408 may provide power to the device 400. In some instances, the power supply unit 408 comprises a power connector that couples to an Alternating Current (AC) or Direct Current (DC) mains power line. In other instances, such as when the electronic device 400 is a mobile phone or other portable device, the power supply unit 408 may comprise a battery.

The memory 414 may include an operating system (OS) 416 and one or more applications 418 that are executable by the one or more processors 412. The OS 416 may provide functionality to present a display portion of a visual/tactile user interface on a display of the electronic device 400, in response to an utterance received by the electronic device 400 via the microphone 406. The applications 418, for example, may provide a plurality of display portions of a user interface, to allow a user to accomplish functionality provided by the application.

The memory 414 may also include one or more communication stacks 420 configured to receive, interpret, and/or otherwise communicate with other devices. For example, the communication stacks may implement one or more of a cellular communication protocol, a WiFi communication protocol, or other wireless or wired communication protocols. The communication stack(s) 420 describe the functionality and rules governing how the device 400 interacts with each of the specified types of networks.

The memory 414 may also store other information. For example, the memory 414 may include menu data 422 whose contents indicate how the electronic device, with applications 418 executing thereon, are to present a plurality of display portions of a user interface.

The various memories described herein (e.g., the memory 414) are examples of computer-readable media. Computer-readable media may take the form of volatile memory, such as random-access memory (RAM) and/or non-volatile memory, such as read-only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain electronic devices (e.g., the example electronic device 400) are described herein, it should be understood that those electronic devices may include other components and/or be arranged differently. As noted above, in some instances, an electronic device may include one or more processors and memory storing processor executable instructions to implement the functionalities they are described as performing. Certain electronic devices may additionally or alternatively include one or more hardware components (e.g., application specific integrated circuits, field programmable gate arrays, systems on a chip, and the like) to implement some or all of the functionalities they are described as performing.

Figure 5:
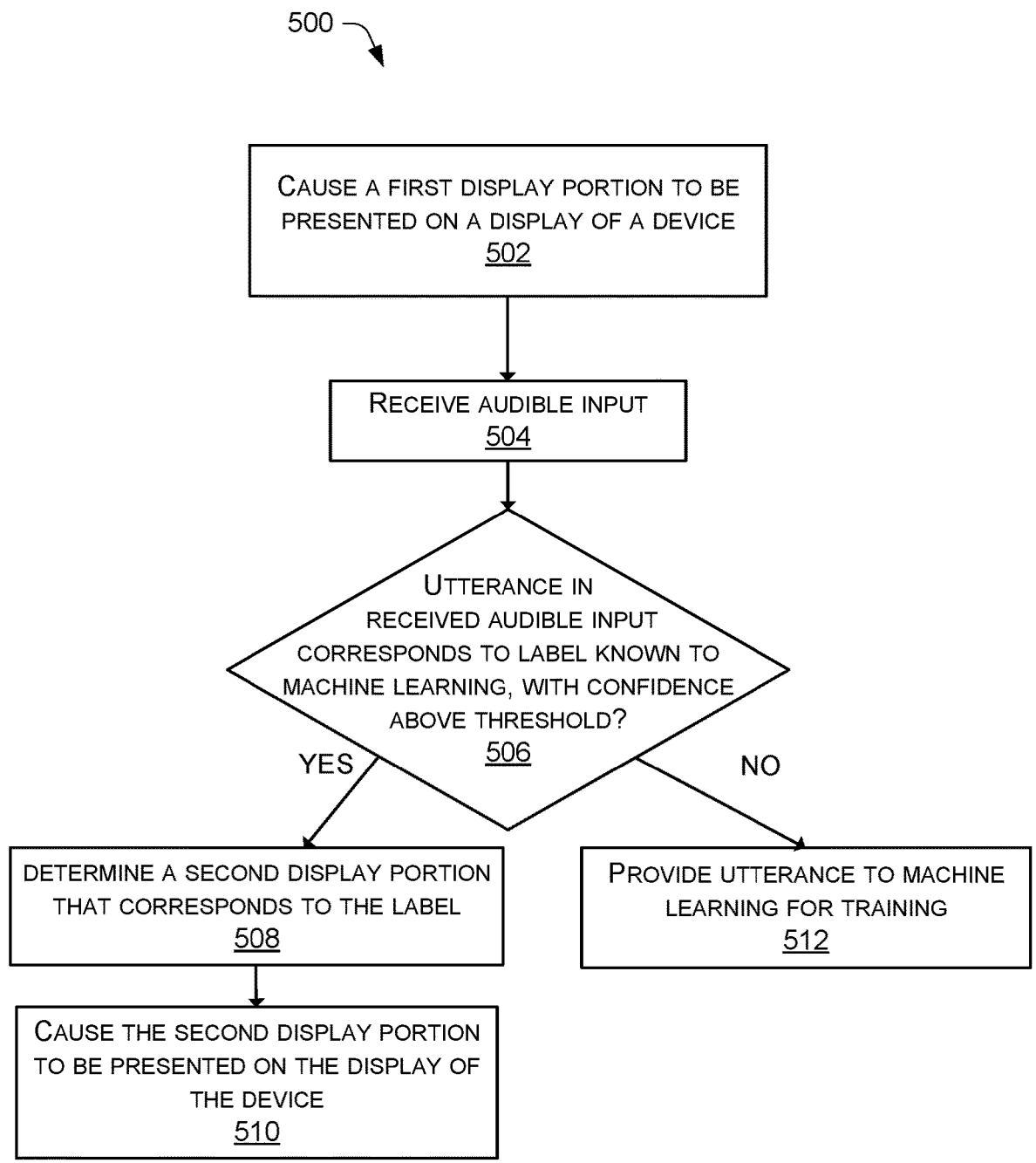
FIG. 5 is a flowchart illustrating an example method to present a first display portion of an application user interface and, based on a user utterance, present a second display portion of the application user interface.

FIG. 5 is a flowchart illustrating an example method 500 of the present disclosure. In some examples, the method may include presenting a first display portion of an application user interface and, based on an utterance in received audible input, presenting a second display portion of the application user interface. As will be described below, in some examples, the second display portion may be presented even though the second display portion may not be directly linked from the first display portion. This can save the user from having to navigate multiple links to reach the second display portion (which, in many examples, is still possible to do). At 502, a processor of an electronic device causes a first display portion of a user interface to be presented on a display of the device. At 504, the one or more processors of the electronic device receives audible input such as, for example, audio energy resulting from speaking by a user of the electronic device.

At 506, the one or more processors of the electronic device determines whether an utterance in the received audible input corresponds to a label known to a machine learning functionality, with confidence above a particular threshold. In the example method 500 illustrated in FIG. 5, the one or more processors processes audible input received by the electronic device, such as via a microphone incorporated into the electronic device, to determine an utterance. One or more processors of the electronic device and/or one or more processors of a network-accessible server or service, may process the utterance to convert the utterance into one or more labels, such as into a bag of words. In the FIG. 5 example, the label determination processing also includes a processor determining a confidence level with which the utterance is considered to match the determined labels, such as determining a confidence level with which the utterance is considered to match a determined bag of words. The confidence level may be a statistical probability, as determined by a machine learning model, that the determined label is correct. This probability may be based, for example, on how close the determined labels are to labels on which the machine learning model was trained. The one or more processors may determine whether to utilize the determined label based at least in part on the corresponding determined confidence level. For example, the determination may be for the label to not be utilized unless the corresponding determined confidence level is above a particular threshold.

For example, the threshold may be determined based at least in part on a level of confidence, determined for a set of training utterances that do not correspond to any label known by the label determination processing, that a particular training utterance corresponds to a label known by the label determination processing. The level of confidence determined in this way should, statistically, be lower than a level of confidence determined for actual utterances that do correspond to labels known by the label determination processing. By setting the threshold above the level of confidence determined for a set of training utterances that do not correspond to any label known by the bag of words processing, this should minimize the number of false positive matches of actual utterances to labels known by the bag of words processing.

At 508, when the one or more processors determines that the utterance corresponds to a label with confidence above the particular threshold, the one or more processors determines a second display portion of the user interface, that corresponds to the label. At 510, the one or more processors causes the second display portion to be presented on a display of the device.

At 512, when the one or more processors determines that the utterance does not correspond to a label with confidence above the particular threshold, the one or more processors causes the utterance to be provided to a machine learning functionality to additionally train the machine language functionality.

Furthermore, in some examples, the processing at 508, to determine a second display portion that corresponds to the label, may depend at least in part on data associated with the user of the electronic device, as shown. For example, the application for which the process 500 is causing application user interface display portions to be displayed may be an application for the user to interact with a financial institution and having the user interface display portions shown in FIG. 3. Furthermore, for example, the one or more processors may have determined at 506 that the utterance in the received audible input corresponds to a label known to the machine learning, with confidence above the threshold. Furthermore, at 508, the one or more processors may have determined that the label corresponds to a display portion for the user to accomplish "mobile deposit" functionality of the user interface display portion corresponding to the "mobile deposit" tactilely activatable link 344. By considering data associated with the user of the electronic device, the one or more processors may cause display of application user interface display portions that are tailored to the user's situation. In some examples, two or more labels may have a confidence level close to (or above) the desired threshold for the same utterance (and may be the same level). In this situation, the application may choose to present a list of options for the labels allowing the user to select the desired action from the list, the application may select an action based on an algorithm that provides a priority ordering where the highest priority action would be performed, or the application may request the user to provide additional context by refining their request (try again).

Figure 6:
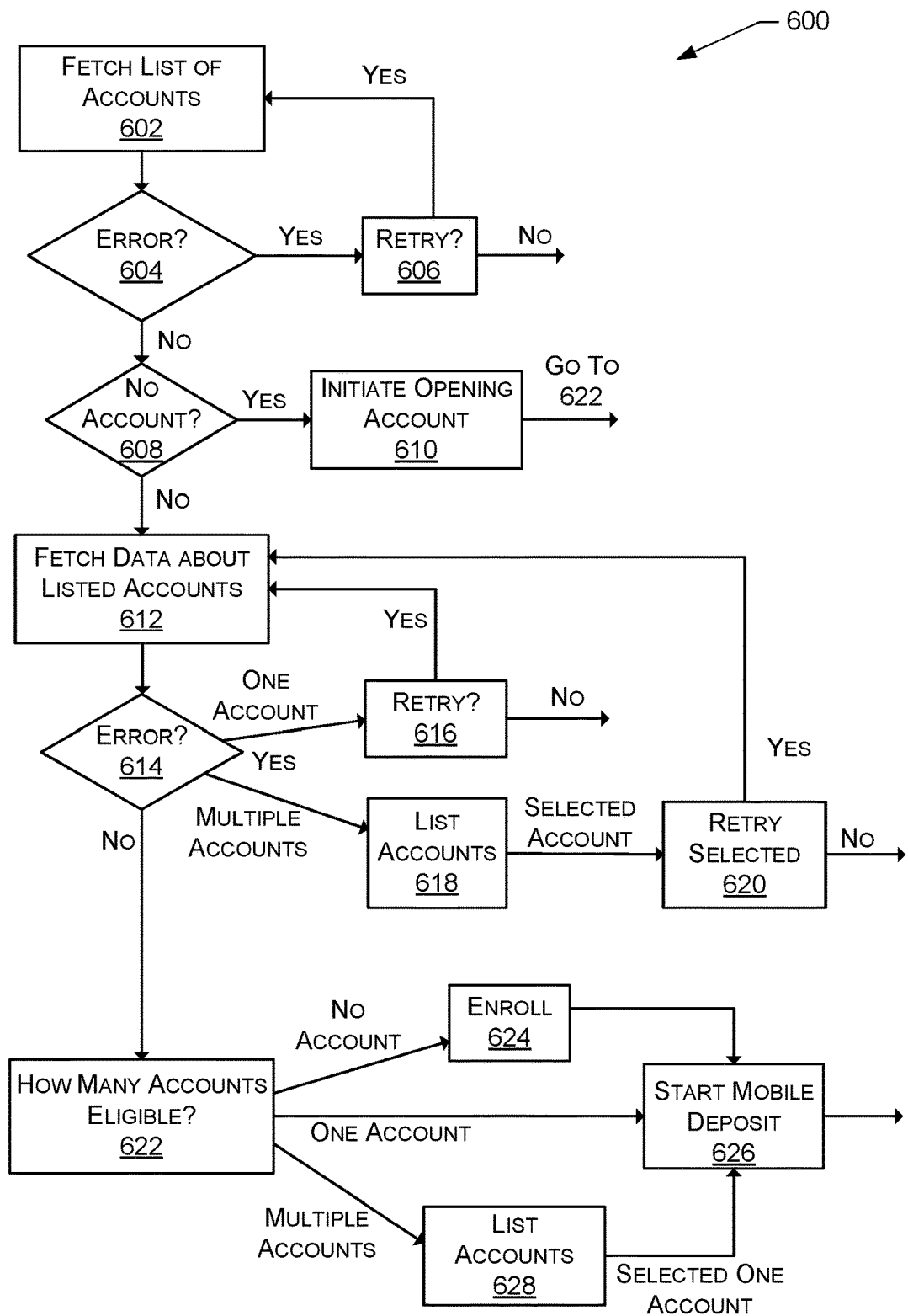
FIG. 6 is a flowchart illustrating an example method to accomplish one step of the FIG. 5 example method for an example scenario.

FIG. 6 is a flowchart illustrating an example process 600 showing more detail of operation 508 for the "mobile deposit" scenario, when the one or more processors determines at 506 that the utterance corresponds to the "mobile deposit" label with confidence above the particular threshold. The process 600 may, for example, include operations that are similar to operations that the one or more processors may perform as a user manually navigates tactilely activatable links from the user display portion corresponding to the "bank" tactilely activatable link 306 to the user interface display portion corresponding to the "mobile deposit" tactilely activatable link 344.

At 602, the one or more processors fetches a list of bank accounts, such as from the service provider 108. At 604, if the one or more processors experiences an error fetching the list of bank accounts, then at 606, the one or more processors cause an error indication to be displayed, which may include the one or more processors including, in the error indication an item that may be activated by the user to retry the desired "mobile deposit" operation.

At 608, the one or more processors may determine the user has no accounts, and the one or more processors may therefore cause display of a user interface item at 610 to allow the user to initiate a process of opening an account. After operation 610, processing may continue at operation 626 (described below) to start a mobile deposit.

Otherwise, at 608, the one or more processors may determine the user does have accounts. Then, at 612, the one or more processors may fetch details about each account, such as data from which the one or more processors can determine which of the accounts, if any, are eligible for mobile deposit.

At 614, if the one or more processors experiences an error fetching data about the listed bank accounts, processing continues at 616 if the user only has one account. At 616, the one or more processors may cause an error indication to be displayed, which may include the one or more processors including, in the error indication an item that may be activated by the user to retry operation 612 to fetch data about the listed one account.

Otherwise, at 614, if the one or more processors experiences an error fetching data about the listed bank accounts, processing continues at 618 if the user has multiple accounts, with the one or more processors causing a listing of the multiple accounts to be displayed. At 620, the one or more processors may cause an error indication to be displayed, which may include the one or more processors including, in the error indication an item that may be activated by the user to select an account and retry operation 612 to fetch data about the selected listed account.

At 622, the one or more processors may determine how many of the accounts are eligible for mobile deposit. At 622, if no accounts are eligible, the one or more processors may cause display of a user interface portion via which the user may enroll in mobile deposit for one of the accounts. Then, at 626, the one or more processors may cause display of a user interface portion via which the user may begin a mobile deposit into the account.

If, at 622, the one or more processors determine one account is eligible for mobile deposit then, at 626, the one or more processors may cause display of a user interface portion via which the user may cause display of a user interface portion via which the user may begin a mobile deposit into the one eligible account.

If, at 622, the one or more processors determine multiple accounts are eligible for mobile deposit then, at 628, the one or more processors may cause a listing of the multiple eligible accounts to be displayed. Thereafter, at 626, the one or more processors may cause display of a user interface portion via which the user may begin a mobile deposit into a selected one of the multiple eligible accounts.

In the process 600, even after the one or more processors have determined the utterance corresponds to a user interface portion for mobile deposit, the one or more processors display one of at least five different display portions, depending at least in part on the user's situation as characterized, for example, by data associated with the user.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the described techniques may include receiving textual input in place of or in addition to receiving audible input. The textual input may be received, for example, as a result of user inputting text via an actual keyboard and/or via a virtual keyboard presented on a visual/tactile display of an electronic device. Furthermore, the techniques may include providing a textual indication in place of or in addition to providing an audio indication, such as by presenting the textual indication on a display of an electronic device.

With the methods disclosed herein, navigation to various display portions of a user interface is simplified for a user.

What is claimed is:

1. A system, comprising:
a processor;
a sensor operably connected to the processor;
a display operably connected to the processor; and
one or more computer-readable media storing instructions which, when executed by processor, cause the processor to:
display, via the display, a first portion of a user interface without a second portion of the user interface different from the first portion;
receive, from the sensor and while the first portion is being displayed, an audible input;
determine an utterance included in the audible input;
determine, by providing the utterance, as an input, to a machine learning (ML) model, a label associated with the utterance;
identify, based on the label, the second portion of the user interface; and
display, via the display, the second portion of the user interface without the first portion.

2. The system of claim 1, wherein the label is indicative of a particular functionality of a set of functionalities provided by the user interface.

3. The system of claim 1, wherein the ML model is trained on a dataset comprising a set of training utterances, each training utterance corresponding to a label of a set of labels.

4. The system of claim 3, wherein the audible input is a first audible input, and the instructions further cause the processor to:
receive, from the sensor, a second audible input;
determine, based on an output of the ML model, that the second audible input corresponds to an unknown label; and
provide, based on determining that the second audible input corresponds to an unknown label, the second audible input to be added to the dataset.

5. The system of claim 1, wherein the system further comprises a speaker operably connected to the processor, the audible input is a first audible input, and the instructions further cause the processor to:
provide, via the speaker, an audio indication of the second portion; and
receive, from the sensor and in response to the audio indication, a second audible input.

6. The system of claim 5, wherein the instructions further cause the processor to:
determine that the second audible input is indicative of a confirmation,
wherein the second portion is displayed without the first portion based on the confirmation.

7. The system of claim 5, wherein the instructions further cause the processor to:
determine that the second audible input is indicative of a rejection;
display, based on determining that the second audible input is indicative of the rejection, the first portion without the second portion; and
provide the first audible input as training data for additional training of the ML model.

8. The system of claim 1, wherein the instructions further cause the processor to:
determine, based on an output of the ML model, a confidence level associated with the label, the confidence level being indicative of a degree to which the label corresponds to the utterance; and
determine, that the confidence level is higher than a threshold,
wherein the second portion is displayed without the first portion based on determining that the confidence level is higher than the threshold.

9. The system of claim 1, wherein the audible input is a first audible input, and the instructions further cause the processor to:
receive, from the sensor, a second audible input;
determine that a value of a similarity metric between a first representation of the first audible input and a second representation of the second audible input is higher than a threshold; and
adding, based on determining that the value of the similarity is higher than the threshold, the first representation and the second representation to a dataset for training the ML model.

10. The system of claim 1, wherein the instructions further cause the processor to:
receive data associated with a user of the user interface, the processor identifying the second portion based on the data associated with the user.

11. A method, comprising:
displaying, by a processor and via a display operably connected to the processor, a first portion of a user interface without a second portion of the user interface different from the first portion;
receiving, by the processor and while the first portion is being displayed, an audible input;
determining, by the processor, an utterance included in the audible input;
determining, by the processor and based on inputting the utterance to a trained machine learning (ML) model, a label associated with the utterance;
identifying, by the processor and based on the label, the second portion of the user interface; and
displaying, by the processor and via the display, the second portion of the user interface without the first portion.

12. The method of claim 11, further comprising:
receiving, by the processor, data associated with a user of the user interface,
the processor identifying the second portion based on the data associated with the user.

13. The method of claim 11, wherein the ML model is trained on a dataset
comprising utterances and corresponding labels, the method further comprising:
adding, by the processor, the utterance and the label to the dataset for additional training of the ML model.

14. The method of claim 11, further comprising:
providing, by the processor, an audio indication or a haptic indication indicative of the second portion; and
receiving, by the processor and in response to the audio indication or the haptic indication, a confirmation from a user of the user interface,
the processor displaying the second portion based on receiving the confirmation.

15. The method of claim 11, further comprising:
determining, by the processor, a confidence level associated with the label; and
determining, by the processor, that the confidence level is higher than a threshold,
the processor displaying the second portion based at least in part on determining that the confidence level is higher than the threshold.

16. The method of claim 11, wherein:
the label is indicative of a particular functionality of a set of functionalities provided by the user interface, and
the second portion of the user interface is associated with the particular functionality.

17. The method of claim 16, wherein:
the particular functionality is different from a first functionality of the first portion of the user interface, and
the first portion of the user interface does not include a link to the second portion.

18. A system, comprising:
a means for displaying a user interface;
a means for receiving audible input;
a means for providing audible output;
a means for storing executable instructions; and
a means for executing the executable instructions, the means for executing being configured to:
 display, via the means for displaying a user interface, a first portion of a user interface associated with a first functionality;
 receive, via the means for receiving audible input, a first audible input;
 determine, based on first the audible input, an utterance included in the first audible input;
 determine, by inputting the utterance to a trained machine learning (ML) model, a label associated with the utterance;
 identify, based on the label, a second portion of the user interface associated with a second functionality, different from the first functionality;
 provide, via the means for providing audible output, an audible indication of the second portion;
 receive, via the means for receiving audible input, a second audible input in response to the indication; and
 display, via the means for displaying, and based on the label and the indication, the second portion of the user interface.

19. The system of claim 18, further comprising a means for electronic communication via a communication network, wherein the means of executing is further configured to:
receive, via the means for electronic communication, data associated with a user of the user interface,
wherein identifying the second portion is further based on the data associated with the user.

20. The system of claim 18, wherein the first functionality or the second functionality comprises one of: promoting a product, filing an insurance claim, or performing a banking transaction.

* * * * *